US009016093B2

(12) United States Patent
Ahmed et al.

(10) Patent No.: US 9,016,093 B2
(45) Date of Patent: Apr. 28, 2015

(54) PULLING ROLLS WITH SPRING ELEMENTS HAVING INCREASED ANGULAR LENGTH FOR USE IN GLASS MANUFACTURING AND PROCESSES INCORPORATING THE SAME

(71) Applicant: Corning Incorporated, Corning, NY (US)

(72) Inventors: Izhar Zahoor Ahmed, Painted Post, NY (US); Glen Bennett Cook, Elmira, NY (US); Christopher William Drewnowski, Corning, NY (US); Michael Thomas Gallagher, Corning, NY (US); Ralph Alfred Langensiepen, Cape Coral, FL (US); George Clinton Shay, Hardy, NY (US)

(73) Assignee: Corning Incorporated, Corning, NY (US)

( * ) Notice: Subject to any disclaimer, the term of this patent is extended or adjusted under 35 U.S.C. 154(b) by 196 days.

(21) Appl. No.: 13/675,621

(22) Filed: Nov. 13, 2012

(65) Prior Publication Data
US 2014/0130550 A1  May 15, 2014

(51) Int. Cl.
*C03B 13/16* (2006.01)
*C03B 17/06* (2006.01)
*C03B 35/18* (2006.01)

(52) U.S. Cl.
CPC ............... *C03B 17/068* (2013.01); *C03B 13/16* (2013.01); *C03B 35/185* (2013.01)

(58) Field of Classification Search
CPC ...... C03B 13/16; C03B 17/068; C03B 35/16; C03B 35/18; C03B 35/181; C03B 35/185; C03B 35/189
USPC ........... 65/90, 253, 370.1; 492/30, 31, 33, 34, 492/40
See application file for complete search history.

(56) References Cited

U.S. PATENT DOCUMENTS

| 3,116,053 | A | * | 12/1963 | Ericsson | 432/236 |
|---|---|---|---|---|---|
| 338,696 | A | | 5/1964 | Dockerty | 65/145 |
| 3,329,491 | A | | 7/1967 | Zellers, Jr. et al. | 65/84 |
| 3,661,548 | A | | 5/1972 | Ito et al. | 65/182 |
| 3,682,609 | A | | 8/1972 | Dockerty | 65/83 |
| 3,684,471 | A | | 8/1972 | Matsushita | 65/91 |
| 4,316,733 | A | | 2/1982 | Lawhon et al. | 65/99 |
| 5,257,965 | A | * | 11/1993 | Fuchs et al. | 492/6 |
| 5,908,680 | A | | 6/1999 | Moren et al. | 428/40.1 |

(Continued)

FOREIGN PATENT DOCUMENTS

| WO | WO 2010141832 A1 * | 12/2010 | |
| WO | WO2013/052026 | 4/2013 | C03B 17/00 |

OTHER PUBLICATIONS

International Search Report dated Feb. 12, 2014.

*Primary Examiner* — Cynthia Szewczyk
(74) *Attorney, Agent, or Firm* — Matthew J. Mason

(57) ABSTRACT

In one embodiment, a pulling roll for drawing glass sheet in a down-draw process includes a shaft member and a compliant cover assembly positioned on the shaft member. The compliant cover assembly includes at least one traction disk positioned on the shaft member. The at least one traction disk includes an annular hub and a plurality of spring elements integrally formed with the annular hub. The spring elements project outward from the annular hub such that an end of each spring element is positioned radially outward from a base of each spring element and is circumferentially offset relative to the base of each spring element.

18 Claims, 14 Drawing Sheets

(56) References Cited

U.S. PATENT DOCUMENTS

| | | |
|---|---|---|
| 7,143,797 B2 | 12/2006 | Vannan ............................. 152/7 |
| 2003/0181302 A1 | 9/2003 | Kaiser et al. .................... 492/40 |
| 2007/0213188 A1* | 9/2007 | Yao ................................ 492/16 |
| 2009/0283185 A1 | 11/2009 | Manesh et al. .................. 152/11 |
| 2010/0218559 A1 | 9/2010 | Bucko ............................. 65/253 |
| 2011/0259538 A1 | 10/2011 | Nakayama et al. ........ 162/181.8 |
| 2012/0297836 A1* | 11/2012 | Cook et al. .................. 65/370.1 |

* cited by examiner

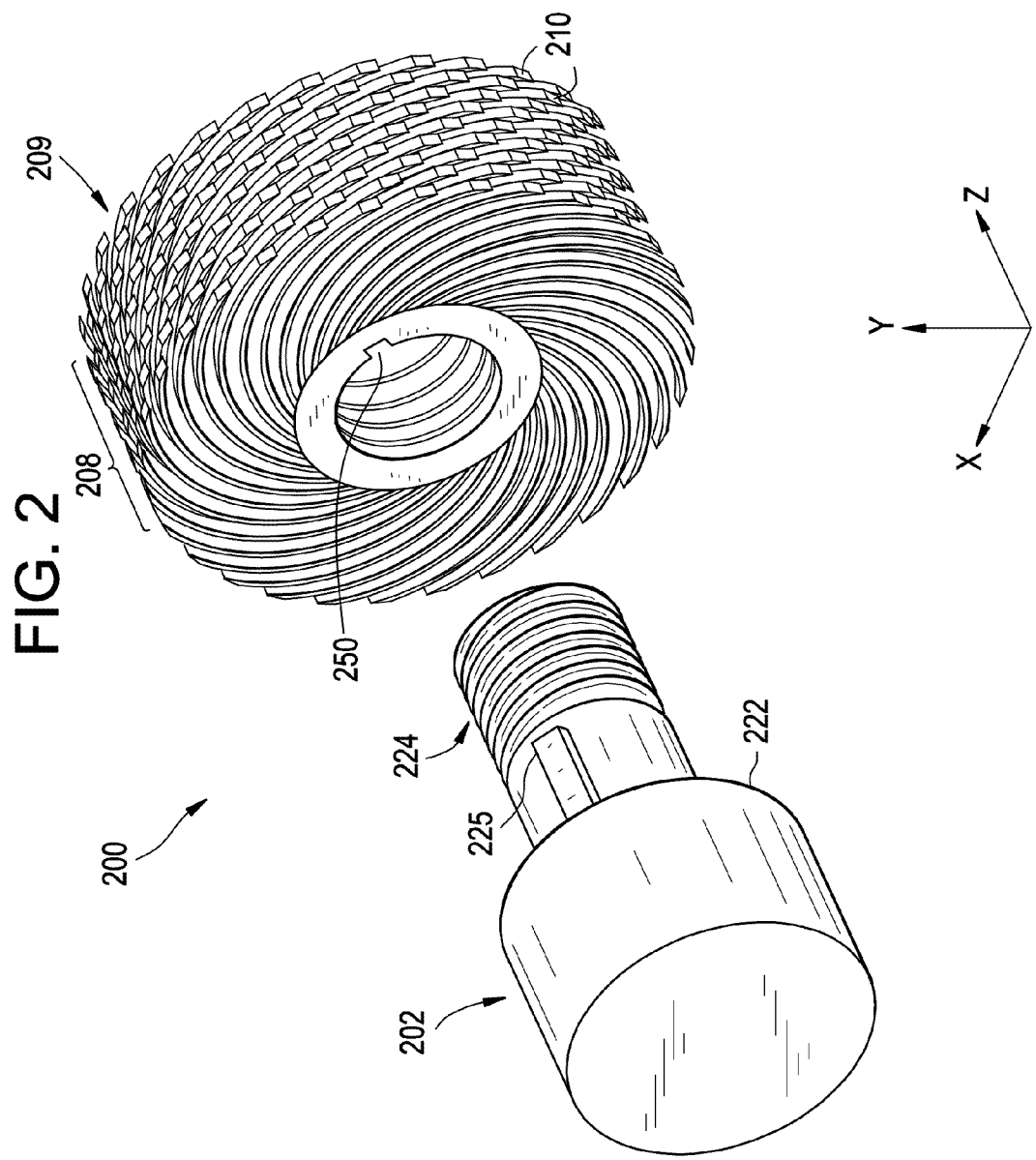

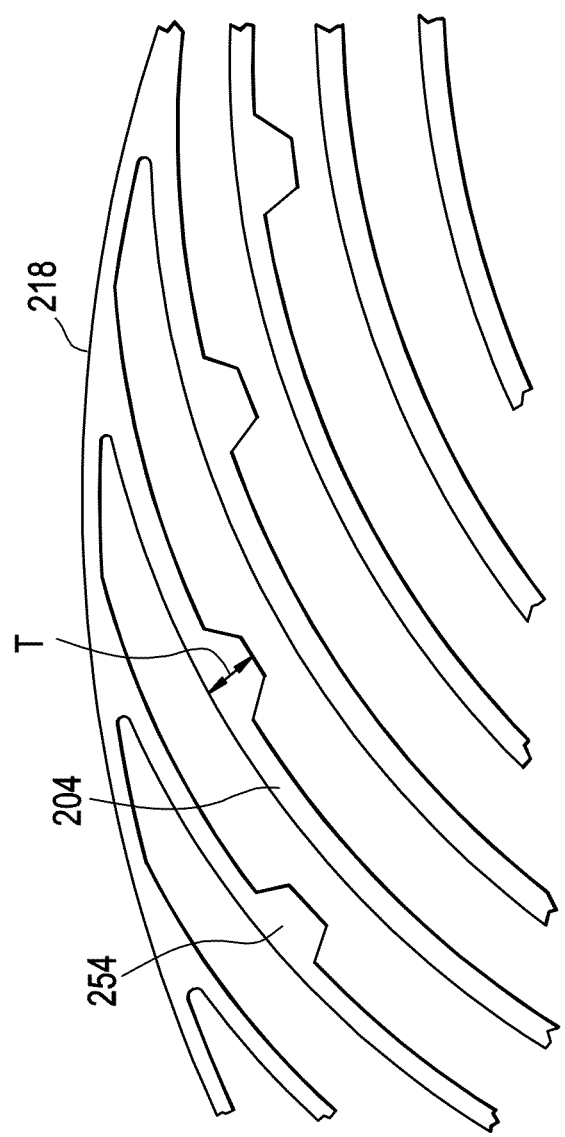

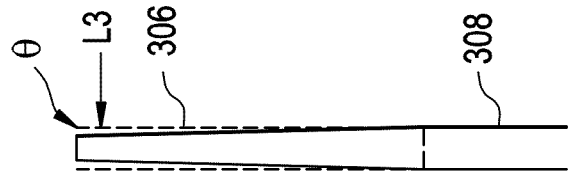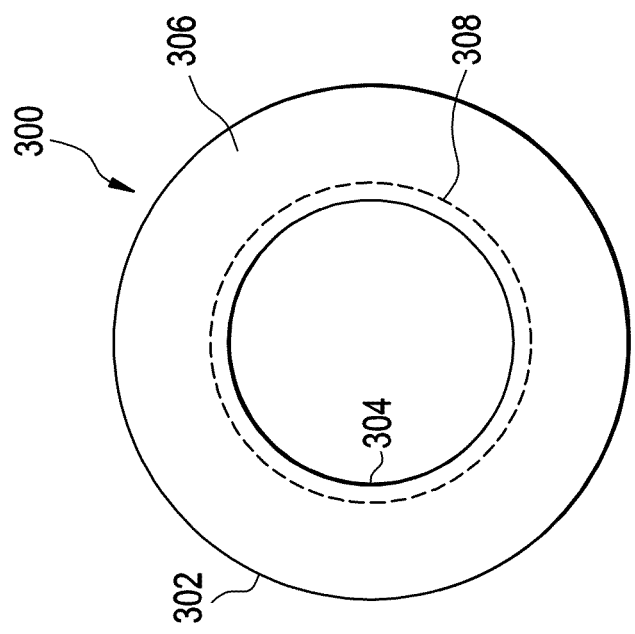

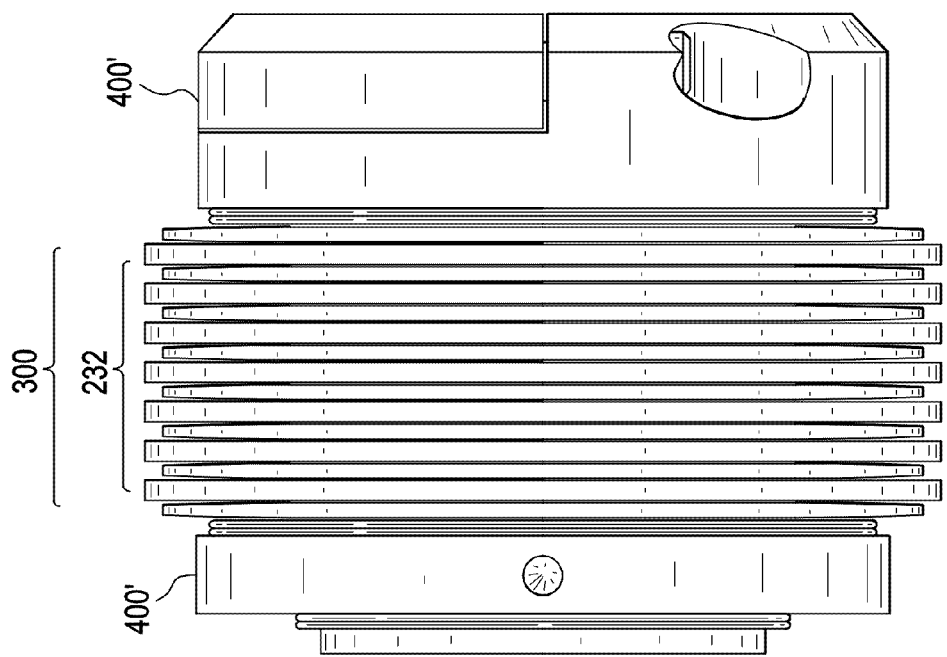

PULLING ROLLS WITH SPRING ELEMENTS HAVING INCREASED ANGULAR LENGTH FOR USE IN GLASS MANUFACTURING AND PROCESSES INCORPORATING THE SAME

BACKGROUND

1. Field

The present specification generally relates to pulling rolls for use in the manufacture of glass sheets and, more specifically, to pulling rolls comprising spring elements for applying a drawing force to glass sheets.

2. Technical Background

Pulling rolls are used in the manufacture of sheet glass to apply tension to a ribbon or web of glass from which individual sheets of glass are formed. The amount of tension applied by the pulling rolls to the glass is utilized to control the nominal thickness of the glass as the glass is drawn from molten glass, such as in an overflow down-draw fusion process, as described in U.S. Pat. Nos. 3,338,696 and 3,682,609, or in similar glass manufacturing processes.

Pulling rolls are generally designed to contact the glass web at its outer edges, usually in an area just inboard of the thickened beads that form at the very edges of the glass web. Because the pulling rolls are in direct contact with the surface of the glass web, damage to the surface of the glass can occur due to the wear characteristics of the pulling roll material. For example, glass particles can become embedded in the surface of the pulling roll resulting in damage to the glass as the pulling rolls contact the glass.

Similarly, the pulling roll may shed particulate matter if the material of the pulling roll degrades with use at the elevated temperatures of the glass drawing process. This particulate matter may become embedded in the soft glass thereby forming defects in the glass. In addition, particulate matter generated from the glass drawing process (e.g., debris, dust, glass shards and the like) may become embedded in the surface of the pulling roll thereby creating repetitive defects in the glass web. Damage to the glass web caused by any of these mechanisms may result in uncontrolled and/or premature breakage of the glass sheet during the drawing process thereby decreasing manufacturing efficiencies and increasing costs.

In addition, particulate matter generated from the glass drawing process may cause the pulling roll to lift off the glass sheet, resulting in a concentrated normal force to bear on not only the sheet but also the pulling roll, which could cause permanent deformations in the pulling roll material.

Accordingly, alternative designs for pulling rolls for use in glass manufacturing processes are needed.

SUMMARY

The embodiments described herein relate to pulling rolls for use in glass drawing processes that reduce the occurrence of premature and/or uncontrolled breakage of the glass sheets drawn with the pulling rolls. Also disclosed are methods for forming glass sheets utilizing pulling rolls that mitigate premature and/or uncontrolled breakage of the glass sheets during a glass drawing process.

According to one embodiment, a pulling roll for reducing premature and/or uncontrolled breakage in glass sheets may include a shaft member and a compliant cover assembly positioned on the shaft member. The compliant cover assembly may include at least one traction disk positioned on the shaft member. The at least one traction disk may include an annular hub and a plurality of spring elements integrally formed with the annular hub. The plurality of spring elements may project outward from the annular hub such that an end of each spring element is positioned radially outward from a base of each spring element of the plurality of spring elements and is circumferentially offset relative to the base of each spring element such that an offset angle A, measured from a line extending radially outward from a central axis through the base of each spring element relative to a line extending radially outward from the central axis through an end of each spring element, is at least 25 degrees. In another embodiment, a pulling roll for reducing premature and/or uncontrolled breakage in glass sheets may include a shaft member and a compliant cover assembly positioned on the shaft member. The compliant cover assembly may include a plurality of traction disks positioned on the shaft member. Each traction disk of the plurality of traction disks may be rotationally offset from adjacent traction disks and each traction disk of the plurality of traction disks may include an annular hub and a plurality of spring elements integrally formed with the annular hub. The plurality of spring elements may project outward from the annular hub such that an end of each spring element is positioned radially outward from a base of each spring element of the plurality of spring elements and is circumferentially offset relative to the base of each spring element such that an offset angle A, measured from a line extending radially outward from a central axis through the base of each spring element relative to a line extending radially outward from the central axis through an end of each spring element, is at least 25 degrees. Each spring element of the plurality of spring elements may be curved between the end and the base in a down-draw rotational direction of the pulling roll.

In yet another embodiment, a method for forming a glass sheet that reduces premature and/or uncontrolled breakage in the glass sheet may include melting glass batch materials to form molten glass and forming the molten glass into a glass sheet. Thereafter, at least a first surface of the glass sheet may be contacted with at least one pulling roll to convey the glass sheet in a downstream direction. The at least one pulling roll may include a shaft member and a compliant cover assembly positioned on the shaft member. The compliant cover assembly may include a plurality of traction disks positioned on the shaft member. Each of the plurality of traction disks may include an annular hub integrally formed with a plurality of spring elements projecting outward from the annular hub such that an end of each of the plurality of spring elements is located radially outward from a base of each of the plurality of spring elements and is circumferentially offset relative to the base of each spring element such that an offset angle A, measured from a line extending radially outward from a central axis through the base of each spring element relative to a line extending radially outward from the central axis through an end of each spring element, is at least 25 degrees. Additional features and advantages of the present disclosure will be set forth in the detailed description that follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 2 schematically depicts a partially exploded view of a pulling roll formed from a plurality of traction disks according to one or more embodiments shown and described herein;

FIG. 10 schematically depicts an exploded view of an outer radial area of another embodiment of a traction disk;

FIGS. 11A and 11B schematically depict axial and radial views of a deflection limiter;

FIG. 13 schematically depicts a pulling roll assembly in which a plurality of traction disks are axially positioned between deflection limiters in an alternating configuration.

DETAILED DESCRIPTION

Figure 1A:
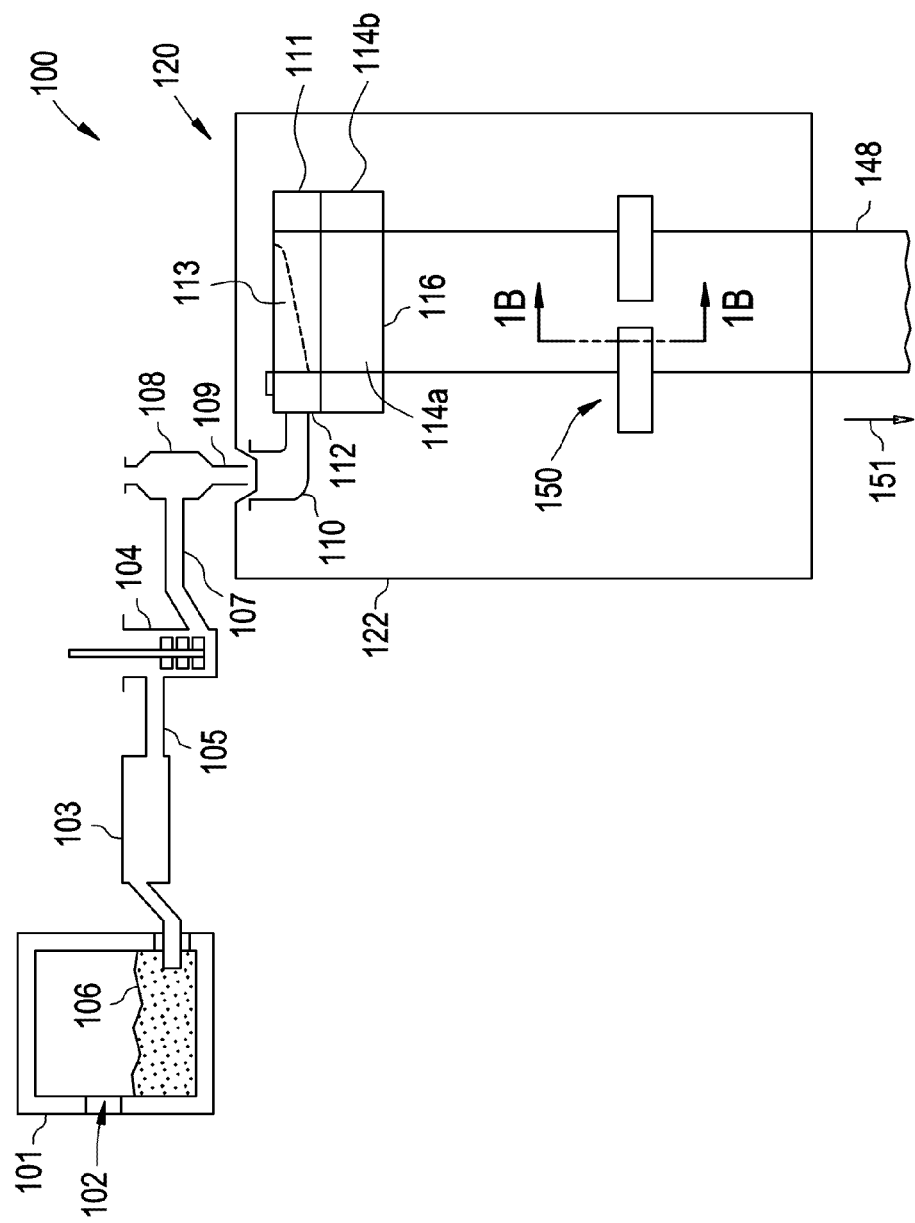
FIG. 1A schematically depicts a glass drawing apparatus for forming glass sheets according to one or more embodiments shown and described herein.

Reference will now be made in detail to various embodiments of pulling rolls for use in the manufacture of glass sheets and glass manufacturing processes incorporating the same. Whenever possible, the same reference numerals will be used throughout the drawings to refer to the same or like parts.

Glass sheet materials may generally be formed by melting glass batch materials to form molten glass and thereafter forming the molten glass into a glass sheet. Exemplary processes include the float glass process, the slot draw process and the fusion down-draw process. In each of these processes, one or more pulling rolls may be utilized to contact the glass sheet and convey the glass sheet in a downstream direction.

Referring to FIG. 1A by way of example, an exemplary glass manufacturing apparatus 100 for forming glass sheet material from molten glass is schematically depicted in which a fusion draw machine is used to form the molten glass into glass sheets. The glass manufacturing apparatus 100 includes a melting vessel 101, a fining vessel 103, a mixing vessel 104, a delivery vessel 108, and a fusion draw machine (FDM) 120. Glass batch materials are introduced into the melting vessel 101 as indicated by arrow 102. The batch materials are melted to form molten glass 106. The fining vessel 103 has a high temperature processing area that receives the molten glass 106 from the melting vessel 101 and in which bubbles are removed from the molten glass 106. The fining vessel 103 is coupled to the mixing vessel 104 by a connecting tube 105. That is, molten glass flowing from the fining vessel 103 to the mixing vessel 104 flows through the connecting tube 105. The mixing vessel 104 is, in turn, coupled to the delivery vessel 108 by a connecting tube 107 such that molten glass flowing from the mixing vessel 104 to the delivery vessel 108 flows through the connecting tube 107.

The delivery vessel 108 supplies the molten glass 106 through a downcomer 109 into the FDM 120. The FDM 120 comprises an enclosure 122 in which an inlet 110, a forming vessel 111 and at least one draw assembly 150 are positioned. As shown in FIG. 1A, the molten glass 106 from the downcomer 109 flows into an inlet 110 that leads to the forming vessel 111. The forming vessel 111 includes an opening 112 that receives the molten glass 106 that flows into a trough 113 and then overflows and runs down two converging sides 114a and 114b before fusing together at a root, where the two sides join, before being contacted and drawn in a downstream direction 151 by the draw assembly 150 to form a continuous glass sheet 148.

Figure 1B:
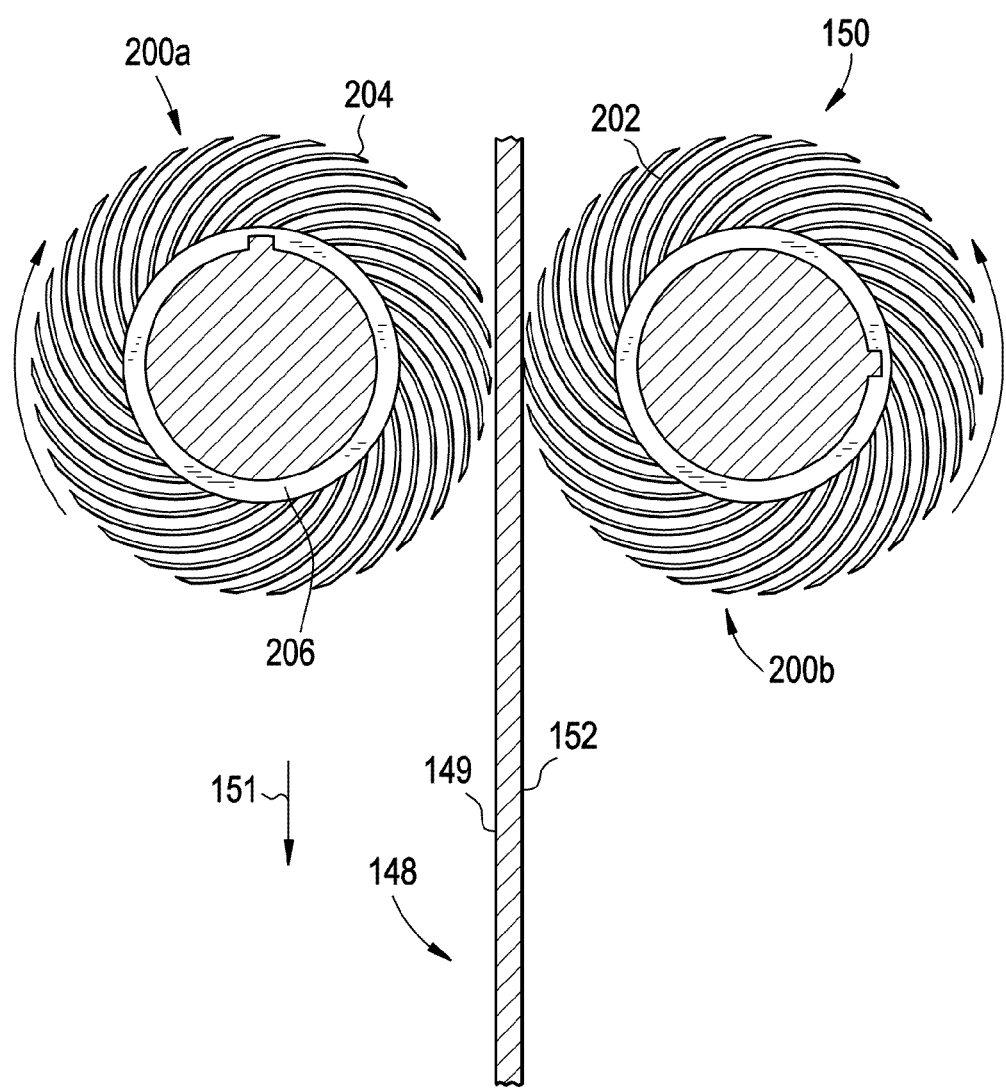
FIG. 1B schematically depicts a cross section of a draw assembly comprising a pair of opposed pulling rolls for use in drawing a glass sheet.

Referring to FIG. 1B, a cross section of the draw assembly 150 is schematically depicted. As shown in FIG. 1B, the draw assembly 150 generally comprises a pair of opposed pulling rolls 200a, 200b that contact the glass sheet 148 on opposite sides. Accordingly, it should be understood that the glass sheet 148 is impinged between the pulling rolls 200a, 200b. The pulling rolls 200a, 200b may be powered (i.e., the pulling rolls 200a, 200b are actively rotated and thus impart a drawing force that conveys the glass sheet 148 in the downstream direction 151) or passive (i.e., the pulling rolls 200a, 200b contact the glass sheet 148 and stabilize the glass sheet as it is drawn in the downstream direction 151 by other pulling rolls).

While the pulling rolls 200a, 200b have been described herein as being used in conjunction with an apparatus that utilizes a fusion draw machine to form the glass sheet, it should be understood that the pulling rolls may be used with similar processes in which glass batch materials are melted to form molten glass and the molten glass is then formed into a glass sheet and drawn with pulling rolls. By way of example and not limitation, the pulling rolls described herein may also be utilized in conjunction with up-draw processes, slot-draw processes, float-draw processes and other, similar glass drawing processes. The pulling rolls may also be used in the drawing of canes and tubing.

As briefly described hereinabove, the pulling rolls used in the aforementioned processes are in direct contact with the glass sheet and, as such, damage to the surface of the glass can occur due to the wear characteristics of conventional pulling rolls. For example, glass particles can become embedded in the surface of conventional pulling rolls resulting in damage to the glass as the pulling rolls contact the glass. Similarly, conventional pulling rolls may degrade with prolonged use at elevated temperatures and shed particulate matter. This particulate matter may become embedded in the soft glass, thereby forming defects in the glass. Regardless of the source, such defects and/or damage may lead to premature and/or uncontrolled breakage of the glass sheet during the glass drawing process thereby reducing manufacturing efficiencies and increasing costs. The pulling rolls described herein utilize spring elements to contact the glass sheet. The spring elements are formed from materials that are stable at elevated temperatures and, therefore, the pulling rolls do not readily degrade after prolonged use or shed particulate matter. Moreover, the pulling rolls are formed with an open structure between the spring elements such that particulate matter can be readily enveloped in the body of the pulling roll rather than embedded into the surface of the pulling roll.

Referring now to FIG. 2, an exemplary pulling roll 200 for use in a glass manufacturing process is schematically depicted. The pulling roll 200 generally includes a shaft member 202 and a compliant cover assembly 208 that is positioned on the shaft member 202. The compliant cover assembly 208 comprises a plurality of traction disks 210 positioned on the shaft member 202 and forming a contact surface 209 of the compliant cover assembly. While the embodiment of the pulling roll 200 depicted in FIG. 2 includes a plurality of traction disks, it should be understood that the compliant cover assembly 208 may be formed from a single traction disk.

The shaft member 202 may include threads 224 on one end while the opposing end is formed with a shoulder 222. The traction disks 210 may be positioned against the shoulder and secured on the shaft member with a nut or another suitable fastener such as, for example, a taper pin. The shoulder 203 may also facilitate securing the pulling roll 200 to a frame or a mechanism for actively rotating the pulling roll 200. In some embodiments described herein, the shaft member 202 further comprises a key 225 for engaging with a corresponding keyway 250 formed in the traction disks 210 of the compliant cover assembly 208, as shown in FIG. 2. In other embodiments (not shown), the shaft member is formed with a keyway for engaging with a corresponding key formed in the traction disks. The interaction between the key and keyway prevents the traction disks 210 from rotating on the shaft member 202 as the pulling roll 200 is rotated.

Figure 3:
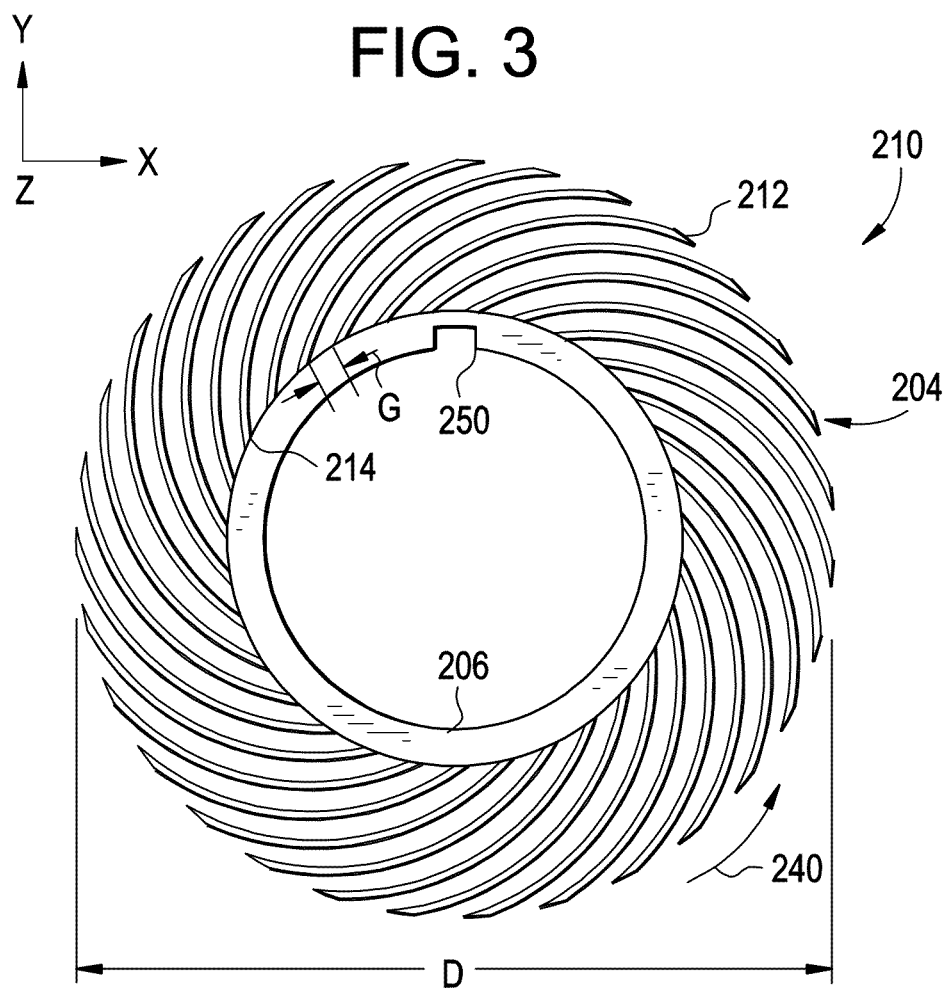
FIG. 3 schematically depicts a traction disk of the pulling roll of FIG. 2 according to one or more embodiments shown and described herein.
Figure 4:
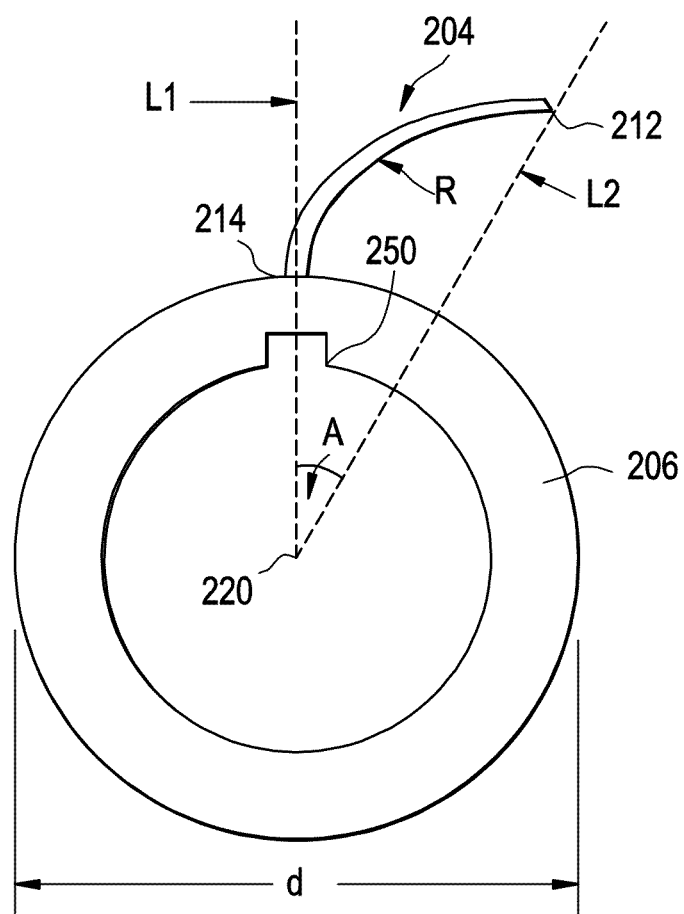
FIG. 4 schematically depicts the annular hub and a single spring element of the traction disk of FIG. 3 for purposes of illustration.

Referring now to FIGS. 3 and 4, a traction disk 210 for use in a compliant cover assembly of a pulling roll 200 is schematically depicted. In the embodiments described herein, the traction disks 210 generally comprise an annular hub 206 and a plurality of spring elements 204. The plurality of spring elements 204 are integrally formed with the annular hub 206 and project radially outward from the annular hub 206 as depicted in FIG. 3. In the embodiment of the traction disk 210 depicted in FIG. 3, the annular hub 206 and the plurality of spring elements 204 are substantially co-coplanar.

As best shown in FIG. 4, each spring element 204 extends between a base 214 and an end 212. Specifically, each spring element 204 is integrally attached to the annular hub 206 at the base 214 such that end 212 of the spring element is positioned radially outward from the base 214 and the annular hub 206. In addition, the end 212 of each spring element 204 is circumferentially offset relative to the base 214 of each spring element 204 such that an offset angle A, measured from a line L1 extending radially outward from a central axis 220 through the base 214 of each spring element 204 relative to a line L2 extending radially outward from the central axis 220 through an end 212 of each spring element 204, is at least 25 degrees, such as at least 30 degrees, and further such as at least 35 degrees and yet further such as at least 40 degrees, and still yet further such as at least 45 degrees, including at least 50 degrees, and further including from 25 to 120 degrees, such as from 35 to 90 degrees, and further such as from 45 to 60 degrees. The spring elements 204 of each traction disk 210 are designed to elastically flex with respect to the annular hub 206 such that, when the pulling rolls are pressed into contact with the surface of a glass sheet to apply a drawing force to the glass sheet, the spring elements 204 elastically displace with respect to the annular hub 206. As a result, the spring elements 204 do not damage the glass sheet while providing a drawing force to the glass sheet.

More specifically, the spring elements 204 of each traction disk can have a radial spring constant (i.e., a spring constant along a radial projection from the annular hub 206) in a range from about 2 lbf/mm to about 2000 lbf/mm (about 8.9 N/mm to about 8896.4 N/mm) or even from about 5 lbf/mm to about 1500 lbf/mm (22.2 N/mm to about 6672.3 N/mm). Spring constants falling within these ranges produce a pulling roll that is sufficiently compliant so as not to damage the glass sheet while, at the same time, being firm enough to provide an adequate traction force against the surface of the glass sheet to facilitate drawing the glass sheet with the pulling roll.

Moreover, a configuration wherein the end of each spring element is circumferentially offset relative to the base of each spring element adds an additional measure of compliance that enables a pulling roll that is not only sufficiently compliant so as not to damage the glass sheet but is also sufficiently compliant so as to minimize the possibility of permanently deforming the spring element, such as when particulate matter generated from the glass drawing process causes the pulling roll to lift off the glass sheet, resulting in a concentrated normal force to bear on not only the sheet but also the pulling roll.

As noted above, debris, such as glass shards or other particulate matter, may contact the pulling roll during the downdraw process. In order to prevent the debris from becoming embedded in the contact surface of the compliant cover assembly of the pulling roll and thereby damaging a glass sheet drawn with the pulling roll, the spring elements 204 of the traction disk 210 are sufficiently compliant in the axial, circumferential, and tangential directions such that, when debris is impinged between the contact surface of the compliant cover assembly, the spring elements displace tangentially, circumferentially and/or axially such that the debris passes between the spring elements allowing the debris to completely pass through the pulling roll or become enveloped in the compliant cover assembly, away from the surface of the compliant cover assembly, thereby mitigating damage to the glass sheet. In the embodiments of the pulling roll described herein, the spring elements 204 generally have an axial spring constant (i.e., a spring constant in the +/− z-direction of the coordinate axes depicted in FIG. 3) that is sufficiently low to facilitate setting the roll tilt angle (i.e., the angle of long axis of the roll with respect to horizontal). For example, the axial spring constant may be from about 0.25 lbf/mm to about 150 lbf/mm (about 1.1 N/mm to about 667.2 N/mm) or even from about 5 lbf/mm to about 75 lbf/mm (about 22.2 N/mm to about 333.6 N/mm). The tangential spring constant (i.e., a spring constant in the direction of arrow 240) should be high enough to prevent excessive deflection at the ends of the spring elements that may interfere with maintaining constant sheet velocity. In the embodiments described herein, the tangential spring constant may be from about 2 lbf/mm to about 75 lb/mm (about 8.9 N/mm to about 333.6 N/mm) or even from about 5 lbf/mm to about 50 lbf/mm (about 22.2 N/mm to about 222.4 N/mm).

Referring now to FIGS. 2-4, in the embodiments of the pulling rolls described herein, the spring elements 204 of the traction disks 210 are formed on the annular hub such that a spacing G between the bases of adjacent spring elements 204 in the circumferential direction is greater than or equal to about 0.01 mm. This spacing is sufficient to permit debris to pass between circumferentially adjacent spring elements 204 rather than embedded in the contact surface 209 of the compliant cover assembly 208. In some embodiments, the spacing G may be greater than or equal to about 0.05 mm.

The thickness T of the spring elements 204 in the circumferential direction generally depends on the type of material from which the traction disks 210 are formed as well as the desired spring constants of the spring elements. In the embodiments described herein, the thickness T of the spring elements 204 is generally in the range from about 0.25 mm to about 3.00 mm. In some embodiments, the thickness T of the spring elements may be from about 0.25 mm to about 1.5 mm. However, it should be understood that the spring elements 204 may have other thicknesses depending on the type of material from which the traction disks 210 are made and/or the desired spring constants of the spring elements. Moreover, the thickness T of the spring elements 204 may by non-uniform between the base 214 and the end, as shown in FIG. 4 while, in other embodiments (not shown), the thickness of the spring elements 204 may be uniform between the base 214 and the end 212. For example, each spring element of the plurality of spring elements can have a thickness T in a circumferential direction that decreases along the length of the spring element between the base and the end, such thickness T at the base is at least 1.2 times T at the end. For example, thickness T at the base can be from 1.2 to 2 times T at the end.

Still referring to FIGS. 2-4, in the embodiments of the pulling rolls 200 described herein, the annular hub 206 of the traction disks 210 generally has an outer diameter d in a range from about 18 mm to about 75 mm while an outer diameter D of the traction disk is in a range from about 60 mm to about 200 mm. Accordingly, it should be understood that the compliant cover assembly of the pulling roll 200 also has an outer diameter in a range from about 60 mm to about 200 mm.

The axial thickness t of the spring elements 204 (i.e., the thickness in the +/− z-direction of the coordinate axes depicted in FIG. 3) and the thickness of the annular hub 206 is generally in the range from about 0.50 mm to about 105 mm. Moreover, for a given material, the axial thickness t of the spring elements 204 may be increased or reduced in order to adjust the axial spring constant of the spring elements 204. In some embodiments, the axial thickness of the annular hub 206 may be greater than the axial thickness of the spring elements 204. In these embodiments, the annular hub 206 is utilized to achieve a desired spacing between axially adjacent spring elements 204 when the traction disks 210 are secured on the shaft member 202. Accordingly, it should be understood that the traction disks 210 may be formed with annular hubs having different thicknesses in order to achieve the desired spacing between axially adjacent spring elements.

Figure 5:
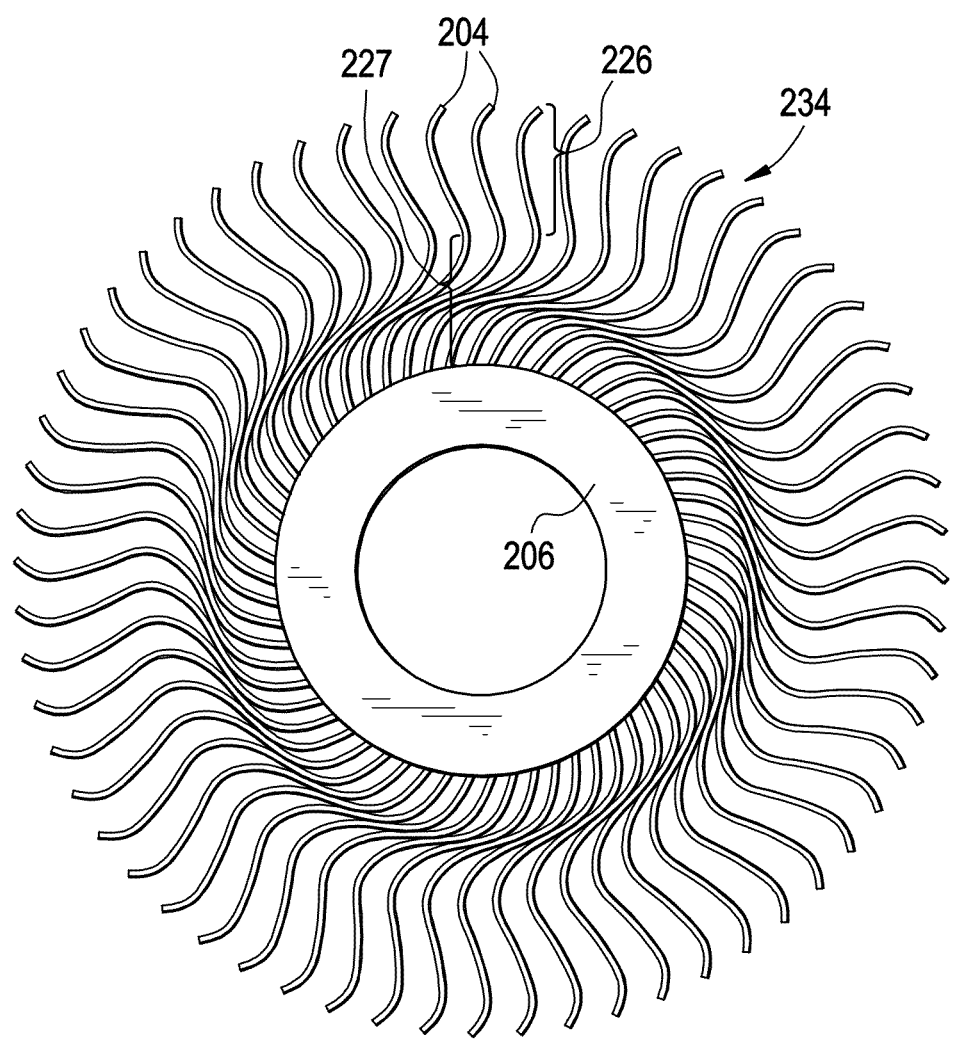
FIG. 5 schematically depicts a traction disk for a pulling roll in which the spring elements of the traction disk have complex curvatures.

In the embodiments of the pulling rolls 200 described herein, the spring elements 204 may be formed with a specific contour to achieve the desired mechanical response (i.e., the desired elastic deformation and stress) when the pulling rolls are pressed against a planar surface of a glass substrate. For example, FIGS. 2-4 depict one embodiment of a pulling roll 200 constructed from traction disks 210 with spring elements that are curved between the end 212 and the base 214 such that, when the ends of the spring elements are engaged with a planar surface of the glass sheet, the spring elements elastically deflect radially inward toward the center of the annular hub and also deflect circumferentially. In some embodiments, the radius of curvature R of the spring elements 204 is constant between the end 212 and the base 214. In these embodiments, the radius of curvature R may be from about 10 mm to about 80 mm or even from about 10 mm to about 40 mm. The spring elements 204 in these embodiments are generally curved in the down-draw rotational direction of the pulling roll such that the spring elements 204 readily flex when they contact the surface of the glass sheet. In other embodiments, the spring elements 204 may have a complex curvature. For example, in some embodiments the radius of curvature of each spring element may increase from the base 214 of the spring element 204 to the end 212 of the spring element 204. In other embodiments, the radius of curvature of each spring element may decrease from the base 214 of the spring element to the end 212 of the spring element 204. In still other embodiments, the spring elements 204 may be formed with a complex curvature in which different segments of the spring element have different radii and/or are curved in different directions. For example, FIG. 5 depicts one embodiment of a traction disk 234 in which the spring elements have a lower portion 227 (i.e., the portion of the spring element closest to the annular hub 206) and an upper portion 226. In this embodiment, the lower portion 227 of each spring element 204 has a first radius of curvature and is curved in the clockwise direction while the upper portion 226 of the spring element 204 has a second, different radius of curvature and is curved in the counterclockwise direction.

Figure 6:
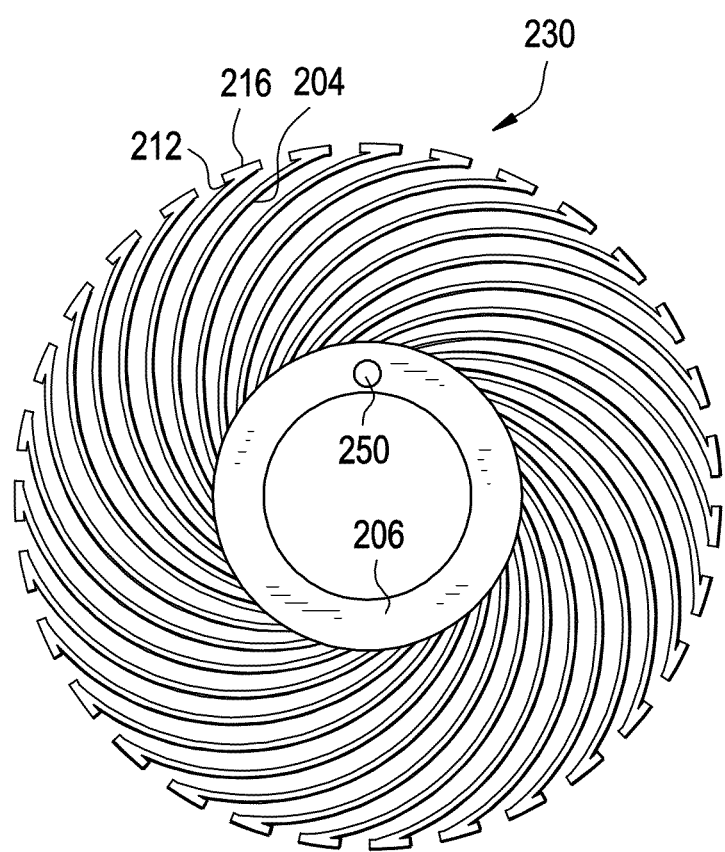
FIG. 6 schematically depicts a traction disk for a pulling roll in which the spring elements of the traction disk include a contact foot.

Referring now to FIG. 6, another embodiment of a traction disk 230 is schematically depicted. In this embodiment, the traction disk 230 is formed with spring elements 204 that include a contact foot 216 formed on the end 212 of each spring element 204. The contact foot 216 increases the contact area between the spring element 204 and the surface of a glass sheet drawn with the traction disk 230. Increasing the contact area between the spring elements 204 and the surface of the glass sheet increases the friction between the traction disk and the glass sheet that allows for a greater torque from the shaft member to be imparted to the glass sheet thereby increasing the down-draw force exerted on the glass sheet without decreasing the elasticity of the spring elements 204 thereby mitigating the potential for damage to the glass sheet during the down-draw process.

As noted hereinabove, the traction disks may be formed with keyways that prevent the traction disks from rotating on the shaft member. In the embodiment of the traction disk 230 depicted in FIG. 6, the keyway 250 is an aperture formed in the annular hub 206. The keyway 250 is shaped to receive a corresponding key (not shown) that is affixed to the shaft member thereby preventing rotation of the traction disk 230 on the shaft member.

Figure 7:
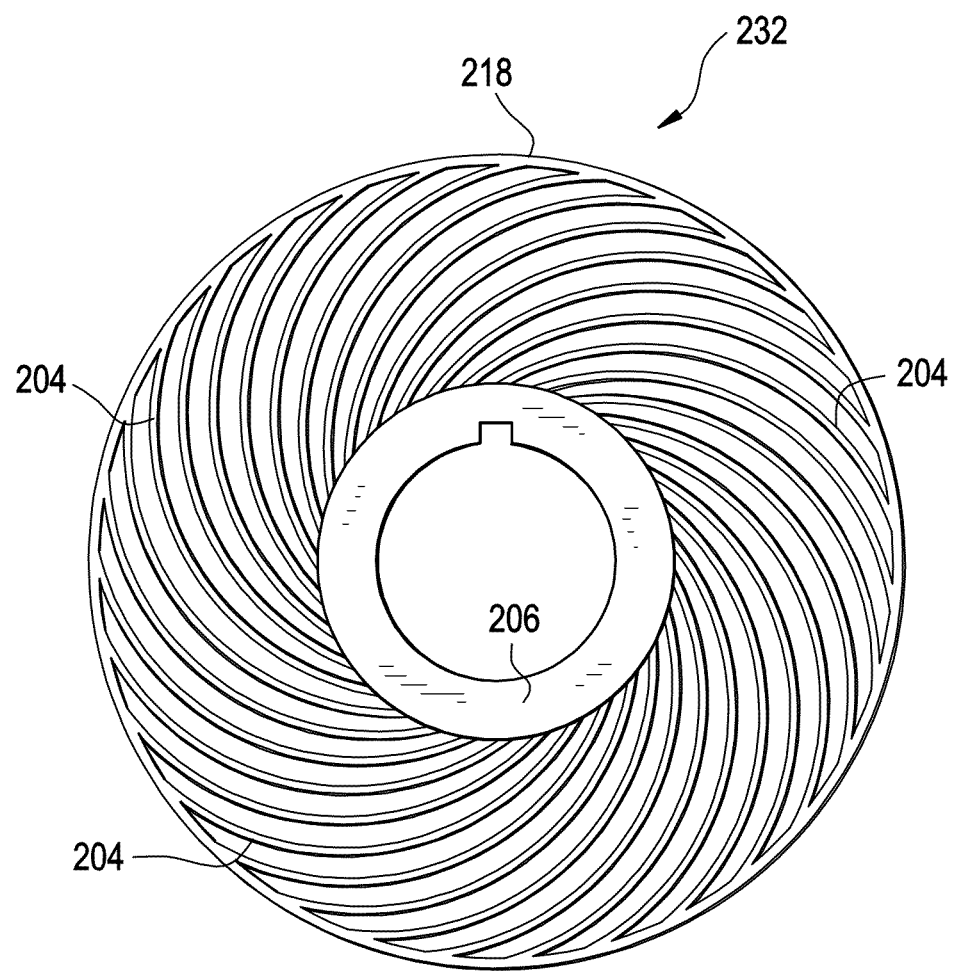
FIG. 7 schematically depicts a traction disk for a pulling roll in which the spring elements of the traction disk are joined by a rim.

Referring now to FIG. 7, another embodiment of a traction disk 232 is schematically depicted. In this embodiment, the traction disk 232 includes a rim 218. The rim 218 joins the end of each spring element of the plurality of spring elements to the end of an adjacent spring element on the same traction disk. In this embodiment, the rim 218 increases the contact area between the spring elements and the surface of a glass sheet drawn with the traction disk 232. Increasing the contact area between the spring elements 204 and the surface of the glass sheet with the rim 218 increases the friction between the traction disk and the glass sheet allowing for a greater torque to be applied to the glass sheet with the shaft member thereby increasing the down-draw force exerted on the glass sheet. Moreover, the curved spring elements 204 of the traction disk 232 allow the rim to be displaced with respect to the annular hub 206 thereby mitigating the potential for damage to the glass sheet during the down-draw process.

Figure 8:
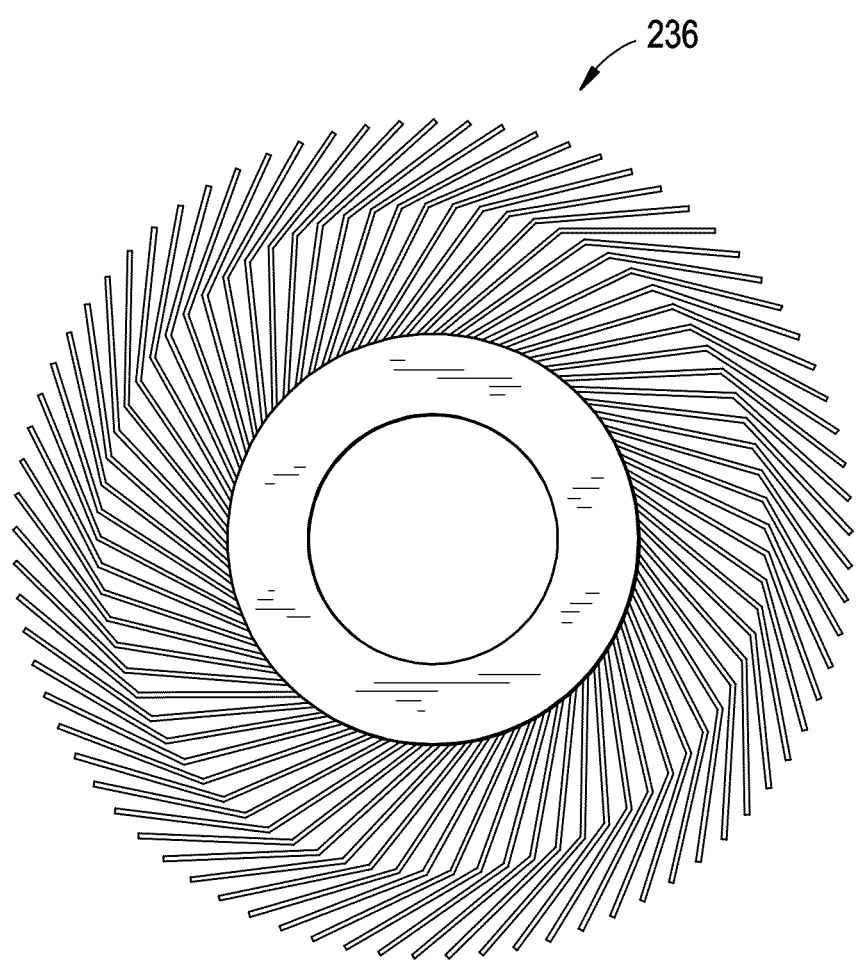
FIG. 8 schematically depicts a traction disk for a pulling roll in which the spring elements have an upper portion that is angled with respect to a lower portion.
Figure 9:
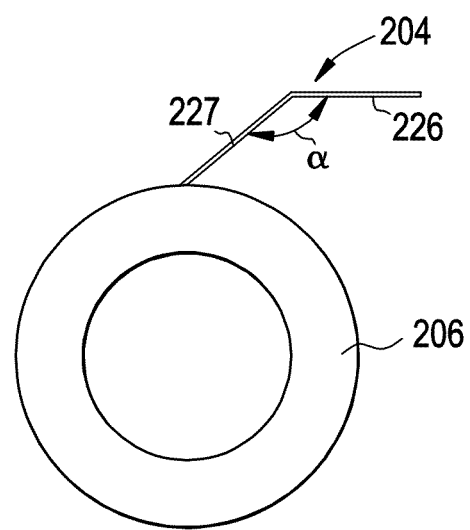
FIG. 9 schematically depicts the annular hub and a single spring element of the traction disk of FIG. 8 for purposes of illustration.

While the pulling rolls have been described herein as being constructed from traction disks having curved spring elements, it should be understood that other embodiments of traction disks are contemplated. For example, FIGS. 8 and 9 depict a traction disk 236 that is formed with angular spring elements 204. Specifically, the traction disk 236 includes an annular hub 206 that is integrally formed with a plurality of spring elements 204 that extend radially outward from the annular hub 206 as described above. Each spring element includes an upper portion 226 and a lower portion 227 with the upper portion 226 of the spring element 204 oriented at an angle α with respect to the lower portion 227. Angling the upper portion 226 of the spring element 204 with respect to the lower portion 227 provides a flexure point at the intersection of the lower portion 227 and the upper portion 226 and facilitates the formation of spring elements with the desired spring constants. Specifically, the position of the flexure point as well as the angle α may be chosen to achieve the desired spring constant for the spring element. The angle α between the upper portion 226 and the lower portion 227 may be, without limitation, about 10 degrees or even about 30 degrees. In some other embodiments, the angle α may be about 45 degrees or even about 60 degrees.

The traction disks depicted in FIGS. 3-9 may be formed from materials that retain their mechanical characteristics at the elevated temperatures encountered during a glass downdraw process that may reach up to about 900° C. Suitable materials include, without limitation, metals, ceramics, metal matrix composites, and mineral-based materials. For example, the traction disks may be formed from nickel-based alloys including, without limitation, Rene 41, Haynes 282, Inconel 718, or similar nickel-based alloys. Examples of suitable ceramic materials include, without limitation, silicon nitride, silicon carbide, alumina, boron carbide, SIALONs, or similar ceramic materials. Suitable mineral materials include, without limitation, bulk mica materials such as phlogopite mica. The traction disks depicted in FIGS. 3-9 may be formed using conventional machining techniques such as, for example, electro-discharge machining (EDM), laser metal sintering, or water jet machining techniques.

Once the traction disks are formed, the traction disks may be coated with a material that improves the oxidation resistance and wear resistance of the traction disks. For example, the traction disks may be coated with Stellite 6, Stellite 12 or other, similar coating materials that improve the oxidation and/or wear resistance of the traction disks.

Referring again to FIG. 2, the individual traction disks 210 are assembled onto the shaft member 202 such that the keyway 250 of each traction disk 210 engages with the key 225 formed on the shaft member 202. In the embodiment of the pulling roll 200 depicted in FIG. 2, traction disks 210 are positioned against the shoulder 222 and a nut (not shown) is threaded onto thread 224 of the shaft member to secure the traction disks on the shaft member 202 thereby forming the compliant cover assembly 208 of the pulling roll. In some embodiments, each traction disk is positioned on the shaft member such that an axial spacing S between adjacent traction disks (i.e., the spacing in the z-direction of the coordinate axes shown in FIG. 2) is from about greater than 0.0 mm to about 25 mm or even from about 0.0 mm to about 25 mm. In some embodiments, the axial spacing S between adjacent traction disks may be from about 0.75 mm to about 6 mm. The axial spacing S between the adjacent traction disks, in conjunction with the spacing G (shown in FIG. 3) between spring elements on a single traction disk, allows debris to penetrate into the compliant cover assembly 208 and pass through the compliant cover assembly rather than embedded at the surface of the complaint cover assembly thereby preventing damage to the glass sheet during the down-draw process.

In the embodiment of the pulling roll 200 depicted in FIG. 2, the individual traction disks 210 are keyed such that each traction disk is rotationally offset from adjacent traction disks when the traction disks are positioned on the key 225 and, as such, the spring elements of axially adjacent traction disks are not aligned with one another. However, in other embodiments, the individual traction disks 210 may be identically keyed such that the spring elements of axially adjacent traction disks are aligned with one another.

FIG. 10 schematically depicts an exploded view of an outer radial area of another embodiment of a traction disk. In this embodiment, spring elements 204 include a lug 254 integrally formed along the length of the spring elements 204, wherein the lug 254 is preferably located proximate to the end of spring elements 204. Upon sufficient application of force to rim 218, spring elements 204 deflect in a radial inward and circumferential direction until lug 254 contacts an adjacent spring element 204, thereby limiting the inward radial deflection of each spring element 204 by a predetermined amount.

The predetermined amount of inward radial deflection of the plurality of spring elements may depend on a number of factors, including, but not limited to the material of which the spring elements are made, the geometric shape or configuration of the spring elements, and the environment (e.g., temperature, etc.) in which the pulling rolls are expected to typically operate. Generally speaking, the predetermined amount should preferably be selected so as to limit the radial inward deflection of the spring elements so as not to strain the spring elements beyond their yield point, such that plastic deformation of spring elements does not appreciably occur.

The circumferential thickness (as indicated by T in FIG. 10) and specific location of the lug along the length of the spring elements can be selected in view of at least one of the factors set forth above. In certain exemplary embodiments, the circumferential thickness of the lug can be at least 1.5 times the circumferential thickness of the spring element on which it is located, such as from 1.5 times to 4 times the thickness of the spring element on which it is located, including from 2 to 3 times the thickness of the spring element on which it is located. In certain exemplary embodiments, the location of the lug along the length of the spring element can be at least 65% of the distance from the base to the end, such as from 65% to 95% of the distance from the base to the end, and further such as from 75% to 90% of the distance from the base to the end.

FIGS. 11A and 11B schematically depict axial and radial views of a deflection limiter 300 that can limit the radial inward deflection as well as the axial deflection of spring elements of one or more traction disks. Deflection limiter 300 includes an outer diameter 302, inner diameter 304, outer region 306, and inner region 308. As shown in FIG. 11B, outer region 306 can be tapered, such that the axial thickness of deflection limiter 300 at outer diameter 302 is less than the axial thickness of deflection limiter 300 at inner diameter 304. The degree of taper in outer region can be determined based on angle θ between L3 and outer region 306 surface. In certain preferred embodiments, θ can be from 0 degrees to 10 degrees, such as from 1 degree to 5 degrees, including about 2 degrees. While deflection limiter 300 is shown in FIG. 11B as being tapered on both sides of outer region 306, it is understood that embodiments herein can include those in which outer region 306 is tapered on only one side or on neither side.

Figure 12:
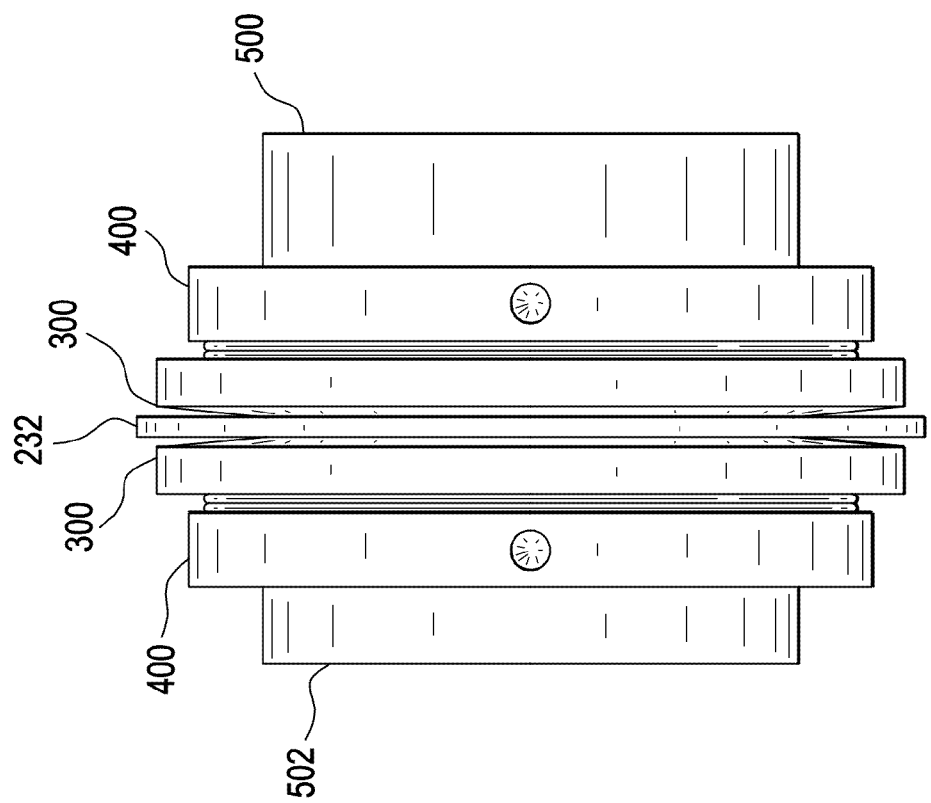
FIG. 12 schematically depicts a pulling roll assembly in which a traction disk is axially positioned between a first and second deflection limiter.

FIG. 12 depicts a pulling roll assembly in which a traction disk 232 similar to that shown in FIG. 7 is axially positioned between a first and second deflection limiter 300 (in the embodiment shown in FIG. 12, each of first and second deflection limiter 300 are tapered on the side facing traction disk 232). Compression disks 400, and washers 500 act to provide axial compression on either side of traction disk 232 and first and second deflection limiter 300. This, along with tapered outer region 306 of each deflection limiter 300 helps to limit axial deflection of spring elements (not shown in FIG. 12) of traction disk 232, as well as minimize stress concentration in a localized area of spring elements, thereby minimizing plastic deformation of spring elements in response to shear axial forces. In addition, deflection limiter 300 acts to limit the radial inward deflection of spring elements so as to minimize plastic deformation of spring elements in response to radial forces. Specifically, upon sufficient application of force to rim of traction disk 232, spring elements deflect in a radial inward and circumferential direction until contacting outer diameter 302 of deflection limiter 300, thereby limiting the inward radial deflection of each spring element by a predetermined amount.

FIG. 13 depicts a pulling roll assembly in which a plurality of traction disks 232 are axially positioned between deflection limiters 300 in an alternating configuration such that each traction disk 232 is axially positioned between a pair of deflection limiters 300. Compression disks 400' act to provide axial compression on either side of the plurality of traction disks 232 and deflection limiters 300.

In preferred embodiments, deflection limiter 300 will have a smaller outer diameter than traction disk 232. For example, in certain preferred embodiments, deflection limiter 300 will have an outer diameter that is less than 99% of the outer diameter of traction disk 232, such as from 80% to 99% of the outer diameter of traction disk 232, including from 85% to 98% of the outer diameter of traction disk 232, and further including from 90% to 97% of the outer diameter of traction disk 232.

In certain preferred embodiments, the difference in outer diameter between deflection limiter 300 and traction disk 232 can range from 1 to 10 millimeters, such as from 2 to 8 millimeters, including from 3 to 5 millimeters. In certain preferred embodiments the difference in outer diameter between 300 and traction disk 232 is less than 5 millimeters, such as less than 4 millimeters.

In certain preferred embodiments, the axial thickness of outer diameter 302 of deflection limiter 300 can range from 5% to 100% such as 50% to 99%, and further such as 90% to 98% of inner diameter 304 of deflection limiter 300.

In certain preferred embodiments, the difference in axial thickness of the outer diameter 302 and inner diameter 304 of deflection limiter 300 can range from 0.1 to 1 millimeter, such as from 0.2 to 0.5 millimeters. In certain preferred embodiments the difference in axial thickness of the outer diameter 302 and inner diameter 304 of deflection limiter 300 can be less than 0.4 millimeters, such as less than 0.3 millimeters.

It should now be understood that the pulling rolls described herein can be used in a glass manufacturing process to draw and/or guide glass sheets. Specifically, spring elements of the traction disks present a smooth, resilient contact surface with which a glass sheet can be contacted without imparting damage to the surface of the glass sheet. Because the pulling roll is constructed from materials suitable for use at elevated temperatures, the pulling rolls do not readily degrade with prolonged use at elevated temperatures or shed particulate matter and/or debris that could contaminate the glass drawing process. Further, the spring elements of the traction disks are sufficiently resilient in the axial, radial and tangential directions to facilitate enveloping particulate matter in between the spring elements reducing damage to the glass sheet.

The spring elements of the pulling rolls described herein increase the radial compliance of the roll thereby providing a more uniform drawing force to a glass sheet. Moreover, the spring elements also provide for an increased contact area of the roll surface while decreasing the contact pressure and shear forces imparted to the glass sheet. In particular, the spring elements mitigate or eliminate particle-derived point loading on the surface of the glass sheet that, in turn, reduces cracking and/or catastrophic failure of the glass sheet.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A pulling roll for drawing glass sheet in a down-draw process, the pulling roll comprising:
    a shaft member; and
    a compliant cover assembly positioned on the shaft member, the compliant cover assembly comprising at least one traction disk positioned on the shaft member, the at least one traction disk comprising:
    an annular hub; and
    a plurality of spring elements integrally formed with the annular hub, the plurality of spring elements projecting outward from the annular hub such that an end of each spring element farthest from the annular hub is positioned radially outward from a base of each spring element and is circumferentially offset relative to the base of each spring element such that an offset angle A, measured from a line extending radially outward from a central axis through the base of each spring element relative to a line extending radially outward from the central axis through an end of each spring element, is at least 25 degrees, each of the plurality of spring elements having a radial spring constant in a range from about 2 lbf/mm to about 2000 lbf/mm wherein, when the compliant cover assembly is engaged with a planar surface of the glass sheet, at least a portion of the plurality of spring elements deflect radially inward, towards a center of the annular hub, thereby preventing damage to the glass sheet.

2. The pulling roll of claim 1, wherein each spring element of the plurality of spring elements is curved between the end and the base.

3. The pulling roll of claim 1, wherein each of the plurality of spring elements has a radial spring constant in a range from about 2 lbf/mm to about 2000 lbf/mm wherein, when the compliant cover assembly is engaged with a planar surface of the glass sheet, at least a portion of the plurality of spring elements deflect both radially inward and circumferentially, thereby preventing damage to the glass sheet.

4. The pulling roll of claim 1, wherein the annular hub has an outer diameter d such that 18 mm≤d≤75 mm.

5. The pulling roll of claim 1, wherein each spring element of the plurality of spring elements has a thickness T in a circumferential direction such that 0.50 mm≤T≤3.0 mm.

6. The pulling roll of claim 1, wherein each spring element of the plurality of spring elements has a thickness T in a circumferential direction that decreases along the length of the spring element between the base and the end, such thickness T at the base is at least 1.2 times T at the end.

7. The pulling roll of claim 1, wherein a separation distance G between adjacent spring elements of the plurality of spring elements in a circumferential direction is such that G≥0.01 mm.

8. The pulling roll of claim 1, wherein the compliant cover assembly has an outer diameter D such that 60 mm≤D≤200 mm.

9. The pulling roll of claim 1, wherein each spring element of the plurality of spring elements has an axial thickness t such that 0.50 mm≤t≤105 mm.

10. The pulling roll of claim 1, wherein the at least one traction disk comprises a plurality of traction disks and each traction disk is rotationally offset from adjacent traction disks in a circumferential direction.

11. The pulling roll of claim 1, further comprising a rim joining the end of each spring element of the plurality of spring elements to the end of an adjacent spring element on a single traction disk.

12. The pulling roll of claim 1, wherein each spring element of the plurality of spring elements further comprises a contact foot integrally formed with the end of each spring element.

13. The pulling roll of claim 1, wherein each spring element of the plurality of spring elements comprises an upper portion and a lower portion, wherein the upper portion is oriented at an angle with respect to the lower portion.

14. The pulling roll of claim 1, wherein the compliant cover assembly is formed from a metallic material, a ceramic material, or a mineral material.

15. The pulling roll of claim 1, wherein the compliant cover assembly is formed from a nickel-based alloy.

16. The pulling roll of claim 1, wherein each of the plurality of spring elements has an axial spring constant from about 0.25 lbf/mm to about 150 lbf/mm.

17. A pulling roll for drawing glass sheet in a down-draw process, the pulling roll comprising:

a shaft member; and a compliant cover assembly positioned on the shaft member, the compliant cover assembly comprising a plurality of traction disks positioned on the shaft member, wherein each traction disk of the plurality of traction disks is rotationally offset from adjacent traction disks and each traction disk of the plurality of traction disks comprises:

an annular hub;

a plurality of spring elements integrally formed with the annular hub, the plurality of spring elements projecting outward from the annular hub such that an end of each spring element farthest from the annular hub is positioned radially outward from a base of each spring element of the plurality of spring elements and is circumferentially offset relative to the base of each spring element such that an offset angle A, measured from a line extending radially outward from a central axis through the base of each spring element relative to a line extending radially outward from the central axis through an end of each spring element, is at least 25 degrees, and wherein:

each spring element of the plurality of spring elements is curved between the end and the base in a down-draw rotational direction of the pulling roll.

18. The pulling roll of claim 17, wherein an axial spacing S between each traction disk of the plurality of traction disks is such that 0.0 mm≤S≤25 mm.

* * * * *